United States Patent

[11] 3,562,523

| [72] | Inventors | Jasper E. Richardson<br>Houston, Tex.;<br>Richard E. Wyman, New Orleans, La. |
|---|---|---|
| [21] | Appl. No. | 633,963 |
| [22] | Filed | Apr. 26, 1967 |
| [45] | Patented | Feb. 9, 1971 |
| [73] | Assignee | Shell Oil Company<br>New York, N.Y.<br>a corporation of Delaware |

[54] METHOD FOR DETERMINING RESIDUAL OIL CONTENT OF A FORMATION USING THERMAL NEUTRON DECAY MEASUREMENTS
4 Claims, 3 Drawing Figs.

[52] U.S. Cl. ..................................................... 250/43.5,
250/83.3, 250/83.6
[51] Int. Cl. ....................................................... G01v 5/00
[50] Field of Search............................................ -
250/43.5D,R, 83.3, 83.6W, 106IL

[56] References Cited
UNITED STATES PATENTS

| 2,335,409 | 11/1943 | Hare............................. | 250/106IL |
| 2,443,680 | 6/1948 | Herzog......................... | 250/106IL |
| 3,102,956 | 9/1963 | Armistead.................... | 250/83.6W |
| 3,240,938 | 3/1966 | Hall, Jr. ....................... | 250/83.6W |

*Primary Examiner*—Archie R. Borchelt
*Attorneys*—Theodore E. Bieber and J. H. McCarthy

ABSTRACT: A method for determining residual oil in a formation that has been reduced to residual oil by water drive or waterflooding. The method measures the thermal neutron decay first with the formation water and then with water having a materially different capture cross section substituted for the formation water at least within the radius of investigation of the logging tool.

PATENTED FEB 9 1971 3,562,523

INVENTORS:
J. E. RICHARDSON
R. E. WYMAN
BY: *Theodore E. Biehn*

THEIR ATTORNEY

METHOD FOR DETERMINING RESIDUAL OIL CONTENT OF A FORMATION USING THERMAL NEUTRON DECAY MEASUREMENTS

The importance of determining residual oil in place by means of subsurface logging techniques has been recognized for some time. At the present new oil fields are becoming more difficult to discover and more attention is being given to secondary and tertiary methods of oil recovery in old fields. In uncased intervals, the oil content can be determined from resistivity logs if the resistivity of the water within the surrounding formation is known and is of sufficient contrast to the oil. It is understood that other parameters such as porosity and lithology must also be known. However, resistivity logs cannot distinguish between oil and fresh water, and it is impossible to obtain resistivity logs in cased wells. Most oil fields that are being considered for secondary and tertiary recovery have only cased wells, since the field has already been produced by primary methods. The cost of drilling new wells for the sole purpose of running logs in uncased boreholes would in all probability render further recovery processes uneconomical.

Recently a new method of logging has been developed that measures the rate at which thermal neutrons are captured after a burst of high-energy neutrons have been emitted from a neutron generator. A description of one system for making such measurements is contained in an article entitled "Neuton Lifetime, A New Nuclear Log" by A. H. Youmans, et al. on page 319, Journal of Petroleum Technology, Mar. 1964. A log that measures the decay rate of thermal neutrons is especially useful, since it will operate equally well in cased wells or uncased wells. Thus, theoretically, it is possible to measure the residual oil in place in both a cased or uncased well by using this logging technique.

Logging tools of the type described above measure the rate of neutron decay following a burst of neutrons from a downhole generator. The rate of neutron decay is dependent upon the capture cross section of the formation rock, the capture cross section of the fluids contained within the formation rock, and the volumetric fractions of the rock and fluids. The measurements reflect only the total capture cross section of the composite material which is dependent upon many variables. If the contrast in the capture cross section between the oil and the formation waters is sufficient and the porosity of the formation is known, then qualitative evaluations of the water saturation can be performed.

In order to understand the present invention it is helpful to review the measurements made by a logging tool for measuring the decay rate of thermal neutrons. Such a logging tool measures a quantity related to the total capture cross section of the formation plus the fluids contained in the formation. This measurement can be expressed as $$\Sigma_t = \frac{1}{v \Delta t} \cdot \ln \frac{N_1}{N_2} \quad (1)$$

wherein $\Sigma_t$ equals the total capture cross section, $v$ equals the velocity of thermal neutrons, $\Delta t$ equals the time between two measurements, and $N_1$ and $N_2$ equal the total counts, or counting rates, recorded by the logging tool during first and second measurements. Each counting rate is the number of pulses per unit time that are due to arrivals of gamma rays at a detector in the tool. The counting rate decays at the same rate as the capture gamma rays which, in turn, decay at the same rate as the thermal neutrons from which they are produced.

The total capture cross section can also be expressed as $$\Sigma_t = \Sigma_r(1-\Phi) + \Sigma_w \Phi A Q S_w + \Sigma_{hc}(1-S_w)\Phi \quad (2)$$

wherein $\Sigma_r$ equals the capture cross section of the formation rock, $\Phi$ equals the porosity of the formation expressed as a fraction, $\Sigma_w$ equals the capture cross section of the water contained in the formation, $S_w$ equals the fraction of the pore volume containing water, and $\Sigma_{hc}$ equals the capture cross section of the hydrocarbon.

Of the above factors, the capture cross section of the water and the capture cross section of the hydrocarbon can be determined with some accuracy from a laboratory analysis of fluid samples obtained from the surrounding formation. In an uncased well, the porosity can often be determined from cores or from one of the conventional porosity logs. In a cased well, the porosity of the formation is sometimes known with a fair degree of accuracy from measurements that were made before the well was completed. A conventional neutron log may aid in determining porosity in cased holes if variables, such as casing and eccentricity borehole and formation fluid content, cement, etc. are known and corresponding measurements have been calibrated to these variables. In either cased or uncased wells, the porosity can be determined by a novel method which is part of this invention and which will be described herein. The capture cross section of the formation rock is usually estimated from cores, from adjacent formations where the porosity, water saturation, and salinity are known, or from arbitrary values based on prior experience. While it was heretofore necessary to estimate the capture cross section of the rock in the above manners, this introduces considerable error into the final calculation of the amount of residual oil contained in the formation. Even in those cases where formation samples are available and analyzed, the required accuracy is most often unattainable, and there is no assurance that the sample is representative. Small amounts of the rare earth elements samarium, europium, and gadolinium with their inherently high capture cross sections will materially change the capture cross section of the formation rocks. Likewise, small amounts of boron will considerably affect the capture cross section of the rock. As a result even chemical analyses of rock samples cannot be relied on in assigning a cross section value to the rock. The value assigned to the capture cross section of the formation rock is a greater source of error in the final result than any other single factor.

The above difficulty is eliminated in the present invention by making the measurements in formations at residual oil saturation and operating the logging tool in a particular manner. The logging tool is first operated to measure the thermal neutron decay with water and residual oil filling the pores of the rock. The first aqueous liquid is then displaced, without displacing any oil, by a second aqueous liquid having a materially different capture cross section. The second liquid can be an aqueous solution of higher, or lower, salinity than that of the first aqueous liquid. For example, if a formation water has a salinity of about 35,000 p.p.m. of NaCl, it can be displaced by an aqueous liquid containing 200,000 p.p.m. of NaCl, which will change the capture cross section of the water by an appreciable amount. The first aqueous liquid is displaced by the second at least throughout a zone that exceeds the zone of investigation of the logging tool. In normal cases a displacement extending 2 to 3 feet from the borehole wall is sufficient. After the first aqueous liquid has been displaced, the log is again run and a new value of thermal neutron decay obtained. This provides the data for two simultaneous equations in which only one independent variable has been changed. The two simultaneous equations can be solved for the product of the two terms $\Phi$ and $S_w$ without the necessity of assigning a value for the capture cross section of the formation rock or of the hydrocarbon.

In order to determine the fractional water saturation, $S_w$, and thereby the residual oil saturation, $1-S_w$, it is necessary to determine the porosity. The porosity can be determined by one of the conventional methods described above or by the following method which is part of this invention. It can be seen from equation (2) that if $S_w$ is known and the oil content is not above water flood residual, the porosity can be determined using the above-described procedure for utilizing a difference in thermal neutron decay rate which is due to a known difference in liquid capture cross section. The present invention can be used solely for the determination of porosity or it can be used to determine porosity as a step in the determination of residual oil. For the latter, it is preferred to make measurements in a relatively homogeneous formation which contains residual oil in its upper portion and 100 percent water saturation in its lower portion, although the invention is not restricted to this type of formation. For the formation given as an example, the porosity determined from its lower portion can be combined with the product $S_w\Phi$ obtained from its upper portion to give the magnitude of $S_w$ and therefore the residual oil saturation $1-S_w$. Using the so-determined fractional water saturation, $S_w$, an equation such as (2) can be solved for the capture cross section of the rock, $\Sigma_r$. The latter can be used with other measurements of thermal neutron decay rates, for example, in measuring the oil remaining after a treatment of the reservoir zone.

It is essential that the first aqueous liquid be displaced by the second without displacing any of the oil that was present during the first measurement of thermal neutron decay. Such a selective displacement of the aqueous liquid is insured when the oil concentration is at least as low as a waterflood residual oil saturation. The term waterflood residual oil saturation is used to refer to the maximum concentration of oil, in an earth formation material, that is not reduced significantly by causing water or an aqueous solution of salt to flow through the oil-containing material. Numerous types of natural or manmade oil displacement operations e.g., natural water or gas drives, waterfloods, steamfloods, firefloods, etc., are capable of reducing the oil concentration of an earth formation at least as low as a waterflood residual.

The present invention can be used to measure the concentration of oil in an oil-containing earth formation after it has been subjected to an oil displacement operation that reduced the oil concentration at least as low as a waterflood residual, or to measure the oil concentration that will be produced when an oil-containing formation is subjected to a selected oil displacement operation that is capable of reducing the oil concentration to at least as low as a waterflood residual. It can be used in open boreholes or in those which contain perforated casings, screens, liners, and other completion systems.

Where it is not known whether the oil concentration of a zone to be investigated is at least as low as a waterflood residual, an aqueous liquid is preferably flowed through the zone until the oil concentration has been reduced to residual. Where desired, the attainment of this can be checked by terminating the injection, reducing the pressure in the borehole below that in the surrounding earth formation, producing fluid, and analyzing fluid produced from the zone to be investigated. If the oil content of that zone is as low as a waterflood residual, the produced fluid will be substantially free of oil. One procedure for obtaining and injecting such an aqueous liquid is to produce aqueous liquid from the zone to be investigated and then inject it in a volume sufficient to reduce the oil saturation to or below a waterflood residual.

In an untreated zone of an oil reservoir a useful sequence of measurements may comprise (1) an initial measurement with the natural oil and water filling the pores of the zone, (2) and (3) measurements with each of two aqueous liquids of distinctively different capture cross sections in the zone after a first aqueous salt solution has been flowed through the zone until the oil content is at a waterflood residual, and (4) a measurement after flowing an aqueous surfactant oil-displacing fluid through the zone. Such a series of measurements may, for example, indicate the initial oil content, the oil content at waterflood residual and oil content after a chemical-aided flood. Such complete information can be extremely helpful in determining the value of an oil reservoir.

The present invention will be more easily understood from the following description when taken in conjunction with the attached drawings in which.

Figure 1:
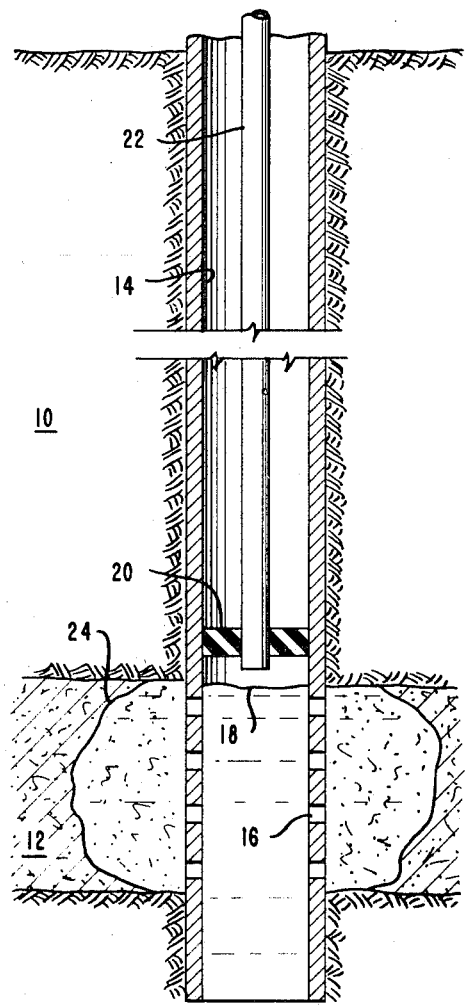
FIG. 1 is an elevation view of a borehole illustrating the method of this invention.

For a more complete understanding of the present invention a brief description of the logging tool is necessary. As briefly mentioned above, the logging tool irradiates the formation with a short pulse of high-energy neutrons. These neutrons pass through the borehole fluid and the well casing, or other materials in the borehole, and are thermalized in the formation. A thermal neutron will only survive for a finite period until it is captured by the material through which it passes. The capturing nucleus is excited and returns to its ground state with emission of one or more gamma rays. The probability of a thermal neutron being captured per cubic centimeter of the medium is designated as the macroscopic capture cross section of the medium, and this is measured by the above-described measurements of the rates at which thermal neutrons are captured. If one assumes that a tool generates a group or cloud of thermal neutrons, the number surviving will decrease exponentially with time at a rate which depends upon the capture cross section of the composite medium.

Under actual logging conditions one does not obtain the homogeneous medium assumed in the equations listed above. For example, the borehole can be considered one medium and the formation another. Thus, initially the signal will have a two-component decay. It is generally the case that the borehole signal will have a faster decay and thus the logging tool delays its measurements in order to see only the formation decay.

The actual neutron pulse may exist for on the order of 30 microseconds once each millisecond. The primary neutrons generated are 14 mev. and are slowed down to thermal energy of 0.025 ev. by surrounding media. The actual measurements made by the tool may consist of two measurements denoted $N_1$ and $N_2$ as set forth above.

Further, the actual measurement is a counting rate based on capture gamma rays that are produced at rates which decay at the same rate as the thermal neutrons. Each measurement of count is made for, say, 200 microseconds with the first count, or gate, being set to start about 400 microseconds after the start of the neutron pulse. The second gate, or count, starts about 100 microseconds after the end of the first count and continues for the same period as the first: 200 microseconds.

If equations (1) and (2) are combined, one obtains $$\Sigma_t = \frac{1}{v\Delta t} \cdot \ln \frac{N_1}{N_2} = \Sigma_r(1-\phi) + \Sigma_w S_w \phi + \Sigma_{hc}(1-S_w)\phi \quad (3)$$

If the capture cross section of the first and second aqueous liquids present during the first and second measurements are designated $\Sigma_{w_1}$ and $\Sigma_{w_2}$ respectively, then equation (3) becomes $$\frac{1}{v\Delta t} \ln \left(\frac{N_1}{N_2}\right)_1 = \Sigma_r(1-\phi) + \Sigma_{w_1} S_w \phi + \Sigma_{hc}(1-S_w)\phi \quad (4)$$

$$\frac{1}{v\Delta t} \ln \left(\frac{N_1}{N_2}\right)_2 = \Sigma_r(1-\phi) + \Sigma_{w_2} S_w \phi + \Sigma_{hc}(1-S_w)\phi \quad (5)$$

Equation (4) can be subtracted from equation (5) to give $$S_w = \frac{1}{v\Delta t(\Sigma_{w_2} - \Sigma_{w_1})} \left[ \ln\left(\frac{N_1}{N_2}\right)_2 - \ln\left(\frac{N_1}{N_2}\right)_1 \right] \quad (6)$$

Equation (6) is independent of $\Sigma_r$ and $\Sigma_{hc}$ and requires only that the porosity $\Phi$ and respective cross sections of the aqueous liquids be known.

The porosity can be determined from equations (4) and (5) if the value of $S_w$ is known, with unity being the preferred value, and if the oil content is not greater than waterflood residual. The equations then become, for the case $S_w = 1.0$, $$\frac{1}{v\Delta t} \ln \left(\frac{N_1}{N_2}\right)_3 = \Sigma_r(1-\phi) + \Sigma_{w_1}\phi \quad (7)$$

$$\frac{1}{v\Delta t} \ln \left(\frac{N_1}{N_2}\right)_4 = \Sigma_r(1-\phi) + \Sigma_{w_2}\phi \quad (8)$$

Equation (7) can be subtracted from equation (8) to give $$\phi = \frac{\ln\left(\frac{N_1}{N_2}\right)_4 - \ln\left(\frac{N_1}{N_2}\right)_3}{v\Delta t(\Sigma_{w_2} - \Sigma_{w_1})} \quad (9)$$

If equation (9) represents the same formation as equation (6), then the two can be combined to give $$S_w = \frac{ln\left(\frac{N_1}{N_2}\right)_2 - ln\left(\frac{N_1}{N_2}\right)_1}{ln\left(\frac{N_1}{N_2}\right)_4 - ln\left(\frac{N_1}{N_2}\right)_3} \quad (10)$$

In this example, we have assumed that $\Sigma_{w_1}$ and $\Sigma_{w_2}$ in equation (6) had the same respective values as $\Sigma_{w_1}$ and $\Sigma_{w_2}$ in equation (9). This is not a necessary requirement. It is only required that all water cross sections be known.

In addition, the measurements can be affected by background radiation. This interference will be most severe in a high-porosity, high water-saturation formation in which the water has a high capture cross section. As a result of the high capture cross section, and thereby rapid decay, the second count, or measurement, will be quite low and the effect of the induced radioactivity can be significant. Normally, the induced radioactivity is chiefly the result of the interaction of a fast neutron with oxygen-16 to produce nitrogen-16 plus a proton. Nitrogen-16 is radioactive and emits a beta particle which leaves oxygen as the residual nucleus. The oxygen nucleus is left in an excited state and emits one of two gamma rays having energies of 6.13 mev. and 7.1 mev., respectively. Nitrogen-16 has a half-life of about 7.3 seconds, which is long compared with the 400 microseconds between the gates of the counting circuit. Thus, it can be assumed that the background radiation does not change between the two counts.

Referring again to equation (6), it is seen that the only sources of error are in the log measurements, the measurement of porosity $\Phi$ or the initial cross section of the water $\Sigma_{w_1}$ and the final cross section $\Sigma_{w_2}$. The log measurements can be made as accurate as desired by using multiple passes. The porosity can be measured with known logging methods or with the novel method described above to ± 1 porosity percent. The value of $\Sigma_w$ and $\Sigma_w$ can be measured with a high degree of accuracy as long as steps are taken to insure that the second aqueous liquid completely displaces the first aqueous liquid. The over all accuracy of the method of this invention can be at least as good as on the order of ± 5 saturation percent, providing precautions are taken to insure accuracy in the logging runs and in the displacing of the aqueous liquids. In uncased wells, resistivity logs have an overall accuracy of about ± 10 saturation percent in the determination of residual oil providing there is sufficient contrast between the resistivities of the oil and the formation water. As mentioned above, such logs cannot be obtained in cased wells and they cannot distinguish between oil and fresh water.

Referring now to FIG. 1 there is shown a borehole that penetrates a nonproducing formation 10 and a producing formation 12. The producing formation 12, the earth formation zone to be investigated, is assumed to be a uniform formation. However, the method of this invention will also work with nonuniform formations. In the case of nonuniform formations, errors may be introduced due to inability to assume a constant porosity for the formation. The borehole is assumed to be cased with a casing 14 having a series of perforations 16 adjacent the producing formation 12, although the invention will work equally well in uncased holes. One or a few perforations can be used as long as a zone around the well can be substantially uniformly swept by fluid injected through the perforations. All the production tubing, packers, and other equipment are assumed to be removed from the well. Further, it is assumed that the well has been produced until its oil content is at least as low as a waterflood residual, e.g., by a natural water drive or a secondary recovery process such as waterflooding or other type of flood. In some formations, especially those that were produced by a gas drive, it may be necessary to flood the formation with an aqueous liquid before the first measurements in order to displace gas away from the zone being investigated. The method of this invention requires that the formation be flooded with an aqueous solution having a known capture cross section and thus, it may be necessary to analyze the solution that is initially present or to inject one for which this property is known.

The first step in the method of this invention is to obtain a thermal neutron decay measurement with the oil content at least as low as waterflood residual and an aqueous liquid of known or determinable neutron capture cross section in place. In those cases where the formation has not been reduced to the residual oil level, it is necessary to inject water into the formation to insure that the formation is reduced to the residual oil level. Of course, it is only necessary to inject sufficient water to exceed the radius of investigation of the logging tool. For example, a salt water containing approximately 20,000 p.p.m. of NaCl and having a cross section of approximately $2.9 \times 10^{-2}$ cm$^{-1}$ could be injected into the formation in the amount of 1 bbl. per foot of zone to be investigated around a borehole having a diameter of 6¼ inch.

Figure 2:
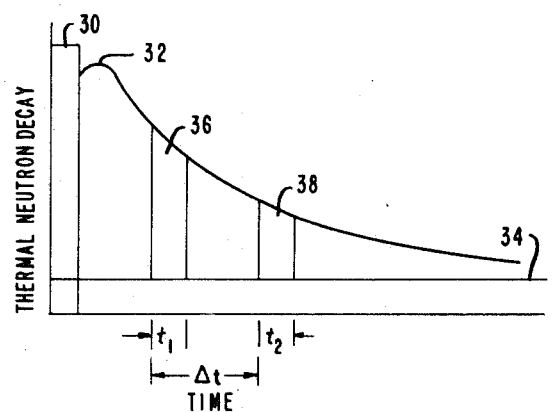
FIG. 2 is the thermal neutron decay curve and measuring intervals used in this invention.

The thermal neutron decay measurements can be obtained by running one of the commercially available tools in the well and recording the counting rates indicated as $N_1$ and $N_2$. The operation of such tools can be more easily understood by referring to FIG. 2 showing the decay curve for thermal neutrons in a borehole and surrounding formations. The pulse 30 represents the pulse of fast neutrons generated by the neutron source in the tool. This pulse may have a length of about 30 microseconds. Following the initial pulse, the neutron intensity is allowed to decay before the start of the first counting level. The normal delay is approximately 400 microseconds. The first counting interval $t_1$ may be approximately 200 microseconds long and after a delay of an additional 100 microseconds, the second 200-microsecond counting interval $t_2$ is started. The curve 32 represents the approximate exponential decay of the thermal neutron intensity while the intervals 36 and 38 represent the two counting intervals. The background level of radioactivity in the borehole is represented by the horizontal line 34. From an inspection of this curve, it is readily appreciated that the background level must be known within reasonable accuracy in order for the two counting intervals 36 and 38 to be meaningful. Such tools are usually moved along the zone being inspected so that they indicate the variation with depth of the counting rate during each of the counting intervals.

During the logging of a borehole it is desirable to determine the background radioactivity in the borehole. The present invention may utilize various methods for determining background level. One method consists of moving the logging tool, preferably by pulling it up the hole, towards a selected depth. Upon reaching the selected depth, the tool is stopped and, simultaneously, the neutron source is turned off. The induced radioactivity is recorded during the following 40 seconds, and the recorded curve is extrapolated to the time at which the source was turned off. A plurality of runs are made in this manner at least 10 being desirable to reduce the statistical error. This thus provides an accurate measurement of the background level of the formation surrounding the borehole. As explained above, this background level is primarily the decay of the nitrogen-16.

Another method for determining the background radioactivity is to inject a saturated boric acid water solution into the zone of earth formation to be investigated. Boric acid has a high capture cross section and thus will absorb essentially all the thermal neutrons before the first measurement is made by a logging tool having a delay of at least about 400 microseconds preceding the measurement. While the thermal neutrons are absorbed, the induced nitrogen-16 radioactivity will not be affected, since it is produced by a fast neutron reaction. Thus, the resulting measurement will be almost essentially the background level of the formation. Again it would be desirable to make repeated runs to obtain a sufficiently high number of counts to determine the background level of the formation with accuracy.

In the second step of the method of this invention, the logging tool is withdrawn from the borehole, or disposed so that fluid can be injected past it, and a packer 20 set immediately above the formation 12. A suitable tubing string 22 is run through the packer to inject a different, second, aqueous solution into the formation. The second aqueous solution should have a materially different capture cross section from the first aqueous solution. Although many materials can be used for changing the capture cross section of water, common salt, or NaCl, is the most readily available and possibly the cheapest that can be used. Further, since the formation fluids already contain NaCl the use of additional NaCl will not materially affect the pores or other conditions of the formation. A sufficient amount of the second aqueous liquid must be injected to insure that the first is displaced at least beyond the radius of investigation of the logging tool. Commercially available thermal neutron decay rate logging tools have a radius of investigation of about 1 foot. Thus, if the fluid was displaced by a radius of 2 to 3 feet around the borehole, one will obtain satisfactory results. As shown in the drawing, the line 24 represents the interface between the injected second aqueous liquid and the displaced first aqueous liquid. After the fluid has been injected the tubing string and packer are removed from the zone being investigated and the logging tool is again run. Again the counting rates are measured over the interval of interest and preferably the background radioactivity is also measured. The background radioactivity can, of course, be measured as explained above and should substantially equal the original background level providing the same logging tool is used.

In addition to the logging data it is, of course, necessary to know the porosity of the formation in order that the simultaneous equations set forth above can be solved. The porosity data can be obtained from cores or from logs that were run when the well was originally drilled. In the absence of these logs, other types of logs capable of measuring porosity in cased wells could be used, for example, the ordinary neutron gamma-ray log could be used to measure the porosity of the formation after the well had been cased. However, as has been explained, the neutron-gamma ray log yields accurate determinations only if calibrated for the conditions that actually exist. It is particularly difficult to know the conditions, such as eccentricity and cement thickness, in a cased well.

The method of the present invention can be used to determine porosity. A second formation, preferably a portion of the same formation for which the residual oil is being determined, can be used to determine porosity. It is required that the porosity of this second formation be the same or nearly the same as the first, that its water saturation be known, and that its oil content be not greater than waterflood residual. This second formation is treated by the same procedure described in connection with FIG. 1. The known water saturation can be combined with the difference between measurements of the thermal neutron decay rate at each of two different water cross sections, and, as shown by equation (9), this combination gives a determination of porosity.

Figure 3:
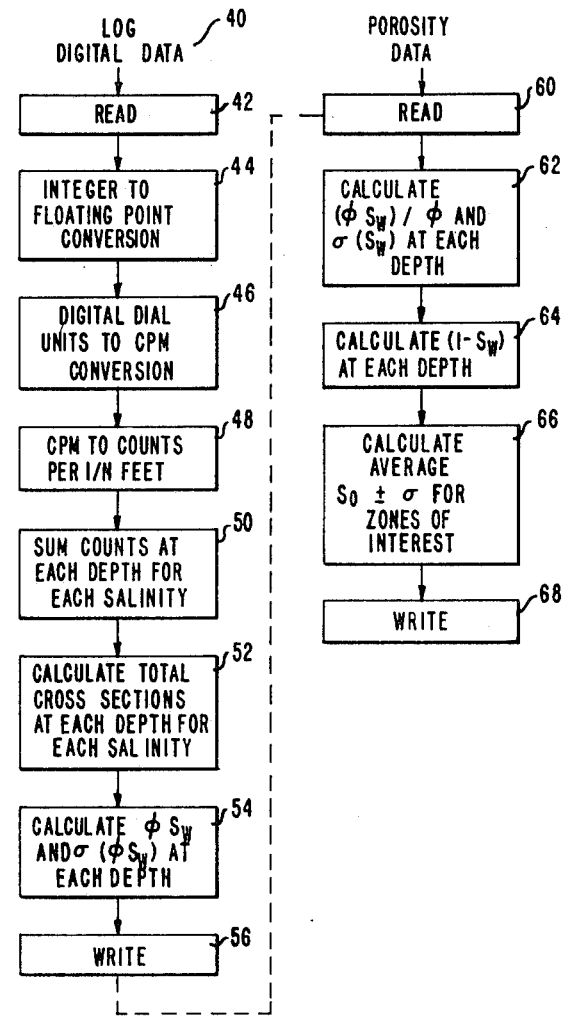
FIG. 3 is a block diagram of a computer program for utilizing the data of this invention.

After the above data is obtained the simultaneous equations can be solved either manually or by the use of a computer. Referring to FIG. 3, there is shown a brief outline of a program for use with a digital computer to solve the simultaneous equations. On the left-hand side is shown the logging data 40 that is first supplied to an analogue-to-digital converter to convert the analogue data to a digital form. For example, each logging curve can be read at equally spaced points, for example, 10 readings per foot. The values from the logging curves are then converted to digital numbers. The digital logging data is then read into the computer at 42 and converted to a floating decimal point at 44. This will permit calculations to whatever decimal point is desired while using logging data in the form of dial units. The digital dial units are next converted at 46 to counts per minute according to the original scale of the logging tool.

The counts per minute are converted to counts per $1/N$ feet at 48 by multiplying the counts per minute by the time required for the logging tool to travel from one reading point to the next. $N$ will equal the product of logging speed in feet/minute times the number of readings per foot in the first step. Next, wherever multiple passes are used to improve the statistics of the measurements, the counts are summed at 50 for each salinity for each depth interval. The total cross section is calculated at 52 by solving equation (1) where $v$ and $\Delta t$ are known. The final calculation at 54 solves the equation $$\phi S_w = \frac{\Sigma_{t_2} - \Sigma_{t_1}}{v \Delta t (\Sigma_{w_2} - \Sigma_{w_1})}$$

and calculates the standard deviation $\sigma$ ($\Phi S_w$). The result of the calculation 54 is recorded at 56 and also supplied to the right-hand side where $S_w$ is calculated.

The computer on the right-hand side receives the porosity $\Phi$ and $\Phi S_w$ data and reads it at 60. The term $\Phi S_w$ is divided by $\Phi$ at step 62 to obtain $S_w$ and the standard deviation $\sigma$ ($S_w$) is computed. The residual oil $1 - S_w$, or $S_o$, is determined at 64 for each depth by subtracting $S_w$ from unity. The average $S_o$ and its standard deviation $\sigma$ is calculated in step 66 by averaging $S_o$ over the formation intervals of interest. The final results of $1 - S_w$ and the standard deviation $\sigma$ are recorded at 68.

We claim:

1. A process for determining the concentration of oil by measurement of thermal neutron decay comprising:

irradiating with a pulse of neutrons an earth formation zone that contains oil and aqueous liquid, with the oil concentration being not more than a waterflood residual oil saturation;

measuring the thermal neutron capture rate response of the formation zone to said first irradiation;

injecting an aqueous liquid into the formation zone to displace aqueous liquid while leaving residual oil in place, said injected aqueous liquid having a materially different thermal neutron capture cross section from said displaced aqueous liquid;

after said injection, irradiating the formation zone with a pulse of neutrons a second time;

measuring the thermal neutron capture rate response of the formation zone to said second irradiation; and measuring the concentration of residual oil by thermal neutron decay rate determinations that utilize the difference between said measured first and said second responses.

2. The process of claim 1 wherein the second aqueous liquid is a saline solution containing sodium chloride.

3. The process of claim 1 where sufficient aqueous liquid is injected to remove the displaced aqueous liquid from within a radius surrounding the borehole that exceeds the radius of investigation of said measuring device.

4. A process for determining the fractional water saturation of an earth formation by means of measurements of thermal neutron capture rates, said process comprising:

flowing an aqueous liquid through a zone of oil-containing earth formation around a borehole until its oil content is reduced to not more than a waterflood residual oil saturation within the radius of investigation of a thermal neutron capture rate measuring unit;

emitting a pulse of neutrons into the borehole of a well and said zone of earth formations and measuring the rate at which the thermal neutrons decay;

adjusting the salt concentration of an aqueous liquid to a measured difference from the salt concentration of the aqueous liquid that was flowed through said zone of earth formations;

injecting enough of the so-adjusted aqueous liquid to displace the first aqueous liquid in the pores of the earth formation throughout the region of investigation of the above measuring step;

measuring the rate at which the thermal neutrons decay after the injection of said liquid having an adjusted salt concentration;

measuring the difference between the two measured thermal neutron decay rates;

measuring the difference in the neutron capture cross sections of the two aqueous liquids having different salt concentrations; and combining said two difference measurements with other properties of said zone of oil-containing earth formation to obtain a determination of the fractional water saturation of the formation surrounding the borehole.